Jan. 7, 1941.  E. P. HARLEY  2,227,579
HANDWHEEL COVER AND METHOD OF MAKING THE SAME
Filed June 7, 1940
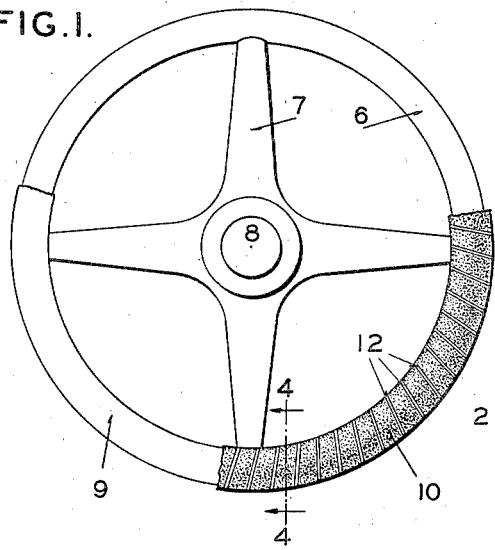
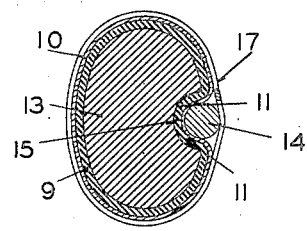
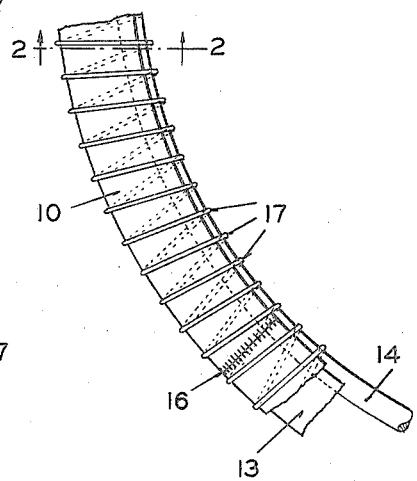
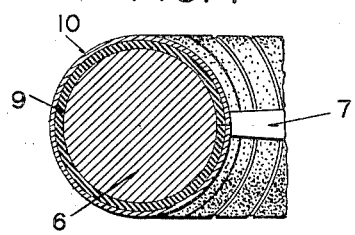
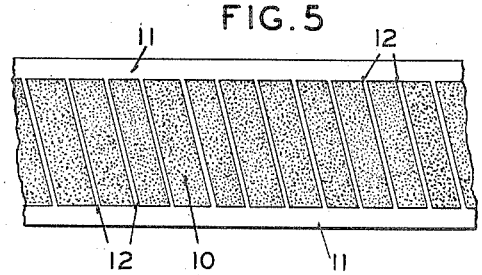
INVENTOR
E. P. HARLEY
BY
ATTORNEY Patented Jan. 7, 1941

2,227,579

UNITED STATES PATENT OFFICE 2,227,579

HANDWHEEL COVER AND METHOD OF MAKING THE SAME

Erskine P. Harley, Oklahoma City, Okla.

Application June 7, 1940, Serial No. 339,221

6 Claims. (Cl. 74—558)

My invention relates to a cover adapted to be applied to the rim of a handwheel to provide a better gripping surface and to minimize the conduction of heat to or from the hand. I have shown a form of cover adapted for use on the steering wheel of an automobile but it may be modified to adapt it to other kinds of hand wheels.

More particularly, my invention pertains to that type of wheel cover which consists of an inner sheath of rubber for contact with the wheel rim and an outer sheath of pile fabric secured thereto for contact with the hands. Heretofore it has been proposed to form such covers by either vulcanizing or cementing the inner and outer sheaths together throughout their entire area of contact. Neither of these methods is satisfactory. If vulcanization is employed, the pressure necessary for this operation forces the nap or pile of the fabric into the rubber so that it practically disappears leaving a substantially smooth surface. Cementing, pasting or gluing has been found to produce an unreliable union which soon works loose under the stress of use.

One object of my invention is to overcome the above stated difficulty completely by vulcanizing the inner and outer sheaths together so as to compress the pile only at selected areas, preferably in the form of narrow encircling bands and along the edges. In this way the major portion of the pile is left intact while the necessary union is effectively secured.

Another object of my invention is to provide the cover, when in its natural form before application to the wheel, with inturned or reverse curved edges which will increase its grip upon the wheel particularly along its inner periphery where the action of the drivers' fingers will tend to skew it around the wheel rim transversely.

In the drawing which illustrates one form of wheel cover and the method of making it, Figure 1 is a plan view of an automobile steering wheel to which my cover is applied, the outer sheath being broken away from a portion of the wheel circumference and the entire cover being broken away from another portion thereof; Figure 2 is an enlarged section taken on the line 2—2 of Figure 3; Figure 3 is a fragmentary side view of the cover and mold as assembled for the vulcanizing operation. In this view, for convenience in illustration, the representation of the nap or pile of the fabric has been omitted. Figure 4 is an enlarged section taken on the line 4—4 of Figure 1; and Figure 5 is a development of a portion of the cover.

Referring first to Figures 1 and 4, the numeral 6 indicates the rim and 7 the spokes of an automobile steering wheel mounted on a steering post 8. My cover, which is applied to the rim, consists of an inner sheath 9 of rubber and an outer sheath 10 of pile fabric, preferably the kind known as mohair. These two sheaths are completely vulcanized together only along their edges 11 and along narrow encircling bands 12. The distance between these bands may be varied as desired but I find that a spacing of from three-eights to one-half inch gives satisfactory results. This produces a cover which has a surface comprised mainly of fabric with the pile intact but in which the two plies are firmly secured together. It also results in a ridged shape which not only gives a better gripping surface but provides ventilation for the hands of the user in hot weather.

In carrying out the vulcanizing operation, I employ a mold such as is shown in Figures 2 and 3. This mold is composed of an outer part or core 13 and an inner part or expansion ring 14 both annular in form and made of metal. The diameter of the core is substantially the same as that of the rim of the wheel to which the cover is to be applied and its periphery in cross section (as shown in Figure 2) is equal to that of the said rim. While its form in transverse section may be round like that of the rim, I prefer to make it somewhat oval as shown. In its inner periphery is a groove 15 for the expansion ring. In assembling the cover the inner sheath 9 is first placed on the core and then the outer or fabric sheath is applied to the inner sheath, its ends being secured together in any suitable manner such as a row of stitches 16 (Figure 3). The expansion ring is now applied to force the edges 11 into the groove 15 to give them a reverse curve in the completed cover. A flexible wrapping 17 is now applied spirally around the assembly under high tension. This wrapping increases the pressure of the expansion ring and provides the necessary pressure to form the encircling grooves or bands 12. After the parts have been thus assembled, they are placed in an oven and heated to the required temperature to vulcanize the edges 11 and bands 12. While I have described the edges 11 and bands 12 as the areas vulcanized or completely vulcanized I do not wish to be understood as stating that no vulcanization takes place in the remainder of the cover. The pressure applied by the wrapping and the expansion ring will to certain extent, be distributed throughout the area of the cover. As a result vulcanization will take place to a greater or lesser degree in the entire article. It is, however, only at the area 11 and 12, where direct pressure is applied, that the pile is forced into the rubber so as to produce a contrasting surface smooth relative to the pile in its normal or intact condition.

By this method I am enabled not only to locate the completely vulcanized areas at the places desired but also form the inturned edges which provide the increased grip on the inner periphery of the wheel rim.

Having fully described my invention, what I claim as new and desire to secure by Letters Patent of the United States is:

1. A hand wheel cover comprising an inner tubular sheath of rubber, and an outer tubular sheath of pile fabric, said sheaths being vulcanized together so as to compress the pile of the fabric at selected areas only, the major portion of the pile remaining intact.

2. A hand wheel cover comprising an inner tubular sheath of rubber, and an outer tubular sheath of pile fabric, said sheaths being vulcanized together so as to compress the pile of the fabric along the edges of the cover and along spaced transverse bands, the major portion of the pile remaining intact.

3. A hand wheel cover comprising an inner tubular sheath of rubber, and an outer tubular sheath of pile fabric, said sheaths being vulcanized together so as to compress the pile of the fabric at selected areas only, the major portion of the pile remaining intact, said cover being parted along its inner periphery for application to a wheel rim, the edges of the cover being inturned before application to the rim to increase its gripping effect thereon.

4. A hand wheel cover comprising an inner tubular sheath of rubber, and an outer tubular sheath of pile fabric, said sheaths being vulcanized together so as to compress the pile of the fabric along the edges of the cover and along spaced transverse bands, the major portion of the pile remaining intact, said cover being parted along its inner periphery for application to a wheel rim, the edges of the cover being inturned before application to the rim to increase its gripping effect thereon.

5. The method of forming a hand wheel cover or the like which includes assembling an inner tubular sheath of rubber and an outer tubular sheath of pile fabric, applying pressure to the assembly at selected areas only, the sum of said areas being small relative to the superficies of the article as a whole, and heating the assembly to vulcanize the sheaths together.

6. The method of forming a hand wheel cover which includes assembling a rubber inner tubular sheath of annular form and an outer tubular sheath of pile fabric, said cover being parted along its inner periphery for application to a wheel rim, applying pressure to the assembly only along its edges and to encircling bands, and heating the assembly to vulcanize the sheaths together.

ERSKINE P. HARLEY.